(12) United States Patent
Lyon et al.

(10) Patent No.: US 11,042,656 B2
(45) Date of Patent: Jun. 22, 2021

(54) DATA PORCH FOR THROTTLING DATA ACCESS

(71) Applicant: Hewlett Packard Enterprise Development LP, Houston, TX (US)

(72) Inventors: Geoff M. Lyon, Half Moon Bay, CA (US); Amip J. Shah, Santa Clara, CA (US); Henry W. Sang, Jr., Cupertino, CA (US); Henri J. Suermondt, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 506 days.

(21) Appl. No.: 15/571,053

(22) PCT Filed: Jul. 24, 2015

(86) PCT No.: PCT/US2015/042024
§ 371 (c)(1),
(2) Date: Nov. 1, 2017

(87) PCT Pub. No.: WO2017/018995
PCT Pub. Date: Feb. 2, 2017

(65) Prior Publication Data
US 2018/0165464 A1    Jun. 14, 2018

(51) Int. Cl.
*G06F 21/62*    (2013.01)
*G06F 21/85*    (2013.01)
(Continued)

(52) U.S. Cl.
CPC .............. *G06F 21/62* (2013.01); *G06F 3/062* (2013.01); *G06F 3/067* (2013.01); *G06F 3/0656* (2013.01);
(Continued)

(58) Field of Classification Search
CPC ........ G06F 21/62; G06F 21/78; G06F 21/606; G06F 21/85; G06F 3/067; G06F 3/0659; G06F 3/0656; G06F 3/062; H04L 63/10
See application file for complete search history.

(56) References Cited

U.S. PATENT DOCUMENTS 5,941,943 A    8/1999    Brenner et al.
6,463,485 B1 *  10/2002   Chui ..................... G06F 5/065
                                                       370/229
(Continued)

FOREIGN PATENT DOCUMENTS

CN    1897571 A    1/2007
CN    101075930 A  11/2007
(Continued)

OTHER PUBLICATIONS

Sang-Min Park et al.,"Data Throttling for Data-Intensive Workflows," 2008 IEEE, pp. 1-4.*
(Continued)

*Primary Examiner* — Luu T Pham
*Assistant Examiner* — Canh Le
(74) *Attorney, Agent, or Firm* — Sheppard Mullin Richter & Hampton LLP

(57) ABSTRACT

Examples relate to throttling data access using a data porch. In some examples, an analysis engine is used to access memory and prepare a data response for a data request that is obtained from the data porch via a throttled data buffer. The data response is sent to the data porch via the throttled data buffer, where the throttled data buffer has a throttled data bandwidth that limits a data flow of data requests and data responses between the analysis engine and the data porch. In response to receiving the data response from the analysis engine via the throttled data buffer, the data porch is used to provide the data response to a networked device.

17 Claims, 4 Drawing Sheets

(51) Int. Cl.
*G06F 21/60* (2013.01)
*G06F 21/78* (2013.01)
*G06F 3/06* (2006.01)
*H04L 29/06* (2006.01)

(52) U.S. Cl.
CPC .......... *G06F 3/0659* (2013.01); *G06F 21/606* (2013.01); *G06F 21/78* (2013.01); *G06F 21/85* (2013.01); *H04L 63/10* (2013.01)

(56) References Cited

U.S. PATENT DOCUMENTS

| | | | |
|---|---|---|---|
| 7,302,531 B2 | 1/2007 | Mensching et al. | |
| 8,191,125 B2 | 5/2012 | Dellow et al. | |
| 2002/0167327 A1* | 11/2002 | Samaan | G01R 31/311 324/754.23 |
| 2004/0103252 A1 | 5/2004 | Lee et al. | |
| 2005/0198459 A1* | 9/2005 | Bogin | G06F 5/06 711/167 |
| 2006/0075480 A1 | 4/2006 | Noehring et al. | |
| 2006/0235990 A1* | 10/2006 | Allen | H04L 67/1097 709/232 |
| 2007/0016685 A1 | 1/2007 | Crume | |
| 2008/0126724 A1* | 5/2008 | Danilak | G06F 12/0246 711/162 |
| 2008/0163226 A1 | 7/2008 | Radhakrisnan et al. | |
| 2012/0066439 A1* | 3/2012 | Fillingim | G06F 11/3485 711/103 |
| 2012/0331187 A1* | 12/2012 | Xu | G06F 13/28 710/25 |
| 2013/0007380 A1* | 1/2013 | Seekins | G06F 3/0616 711/154 |
| 2013/0145428 A1 | 6/2013 | Holmes et al. | |
| 2013/0332679 A1* | 12/2013 | Ahn | G06F 13/1652 711/147 |
| 2013/0332681 A1* | 12/2013 | Miller | G06F 13/1626 711/154 |
| 2014/0201490 A1* | 7/2014 | Yoo | G06F 12/023 711/170 |
| 2014/0201500 A1 | 7/2014 | Niell et al. | |
| 2014/0337623 A1 | 11/2014 | Mattsson | |
| 2015/0082441 A1* | 3/2015 | Gathala | G06F 21/566 726/25 |
| 2015/0134886 A1* | 5/2015 | Kim | G06F 3/0688 711/103 |
| 2016/0117105 A1* | 4/2016 | Thangaraj | G06F 3/0625 711/103 |
| 2016/0217086 A1* | 7/2016 | Shan | G06F 21/6218 |

FOREIGN PATENT DOCUMENTS

| | | |
|---|---|---|
| CN | 102291852 A | 12/2011 |
| EP | 3262558 A1 | 1/2018 |
| WO | 2017/018995 A1 | 2/2017 |

OTHER PUBLICATIONS

Ricardo J Rodriguez et al.,"Automating Data-Throttling Analysis for Data-Intensive Workflows," 2012 IEEE, pp. 310-317.*
Security; printed on Feb. 27, 2015 from: https://msdn.microsoft.com/en-us/library/cc972657(v=vs.95).aspx; 4 pages.
Extended European Search Report received for EP Patent Application No. 15899793.2, dated Feb. 27, 2018, 06 pages.
Search Report and Written Opinion received for PCT Application No. PCT/US2015/042024, dated Apr. 20, 2016, 8 pages.

* cited by examiner

DATA PORCH FOR THROTTLING DATA ACCESS

BACKGROUND

Modern techniques for securing information on a server can include data throttling to a malicious user from misappropriating large volumes of data. Such techniques can be implemented as software. Because the software effectively controls the access to the data, a successful malicious attack that compromises the software can result in the malicious actor having full access to the data of a computational environment.

BRIEF DESCRIPTION OF THE DRAWINGS

The following detailed description references the drawings, wherein.

DETAILED DESCRIPTION

As detailed above, software can be used to secure a computing device by using data encryption. However, if such software is compromised, malicious actors can gain full access to the data of the computing device. Examples disclosed herein can make it more difficult for a malicious entity to remotely steal large volumes of data from a compromised system. Specifically, while most existing approaches focus on restricting access to the system via software, the proposed solution physically limits the amount of data that could be accessed in a system via hardware, which serves as a disincentive to potential data theft.

Generic computer memory and data access logic is often optimized for read/write (i.e., access speed) performance and generally provides open access to software regardless of the content's sensitivity. As a result, data access restrictions are often implemented as higher-level software features, which can be subject to malicious attacks by remote entities. Instead, examples described herein physically limit the amount of data that could be accessed from a given system via a restrictive channel implemented in hardware, which serves as a disincentive to potential data theft. Specifically, the rate of external access is limited to data held within a system-on-chip (SoC) with no means to override or by-pass the data throttle implementation within the device via software. Accordingly, modifying the platform is restricted to modification through physical access to the device at the silicon level. Because the rate of data that can be accessed is limited per unit time (e.g., via a self-clearing memory access lock embedded within the SoC), interrogators are frustrated since the small chunks of data that can be accessed are useless until a sufficient number of chunks have been aggregated, which takes an overly long amount of time.

Figure 1:
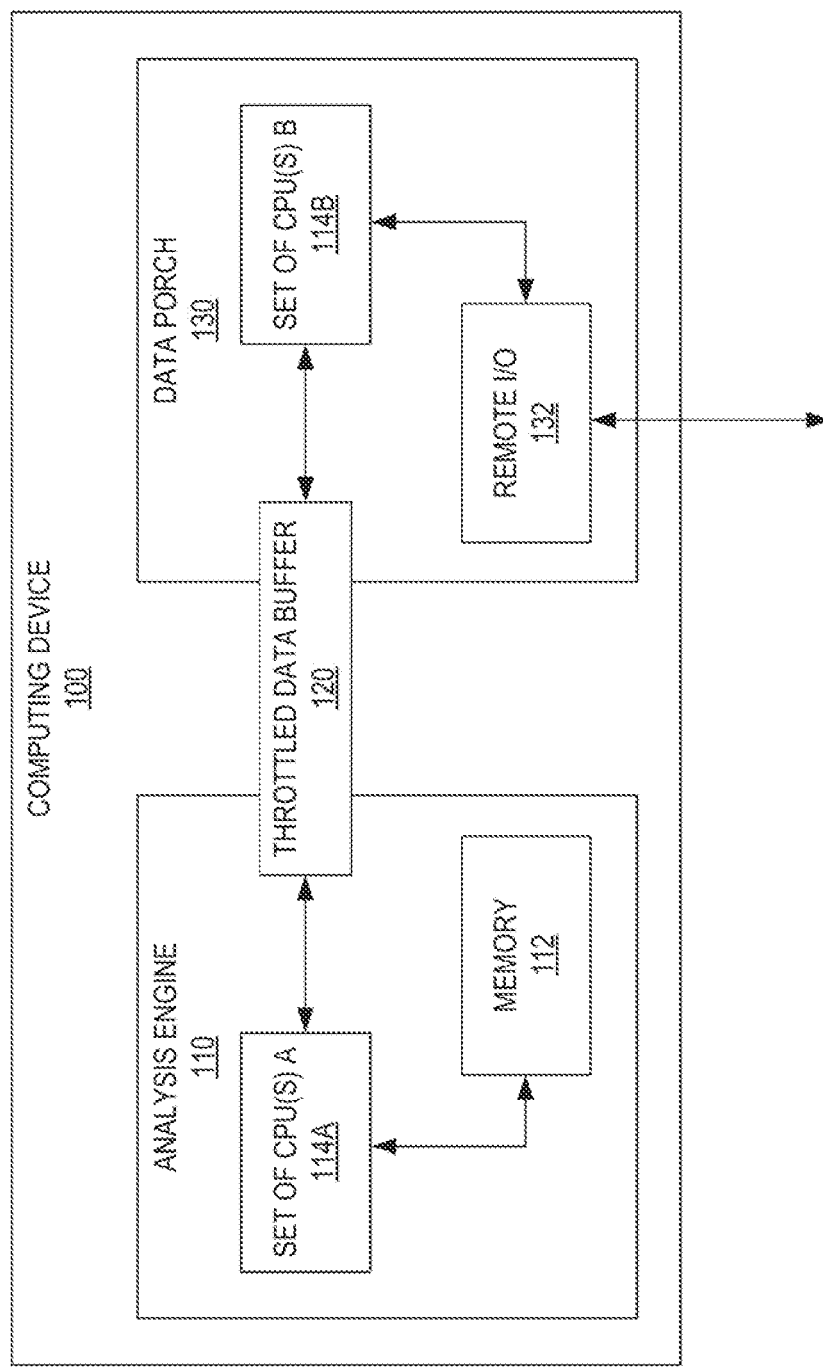
FIG. 1 is a block diagram of an example computing device for throttling data access using a data porch.

Referring now to the drawings, FIG. 1 is a block diagram of an example computing device 100 for throttling data access using a data porch. Computing device 100 may be any device capable of providing computing services such as a desktop computer, a laptop, a tablet, a smartphone, a web server, data server, or other computing device. In the example of FIG. 1, computing device 100 includes analysis engine 110, throttled data buffer 120, and data porch 130.

Analysis engine 110 can handle data requests received by computing device 100. In this example, analysis engine 110 includes at least a set of central processing units (CPU's) 114A and memory 112.

Memory 112 may be any electronic, magnetic, optical, or other physical storage device that stores data for computing device 100. Thus, memory 112 may be, for example, Random Access Memory (RAM), Read-Only Memory (ROM), Electrically-Erasable Programmable Read-Only Memory (EEPROM), flash memory, and the like. In this example, memory 112 is shared memory that is embedded in analysis engine 110. In other cases, each CPU 114A may have separate memory 112 and/or memory 112 may be external to analysis engine 110. Memory is accessible to set of CPU(s) 114A of analysis engine 110 but not accessible to set of CPU(s) 114B of data porch 130.

Set of CPU(s) 114A may include central processing unit(s) (CPUs), microprocessor(s), and/or other hardware device(s) suitable for retrieval and execution of instructions. Each CPU in the set of CPU(s) 114A may fetch, decode, and execute instructions to perform analysis and provide responses to data requests, etc. Data processed by analysis engine 110 can be provided to data porch 130 via throttled data buffer 120. As an alternative or in addition to retrieving and executing instructions, the set of CPU(s) 114A may include electronic circuits comprising a number of electronic components for performing such functionality.

Data porch 130 can receive data requests from and provide data responses to other computing devices. In this example, data porch 130 includes a set of central processing units (CPU's) 114B and memory remote input/output (I/O) 132. Data porch 130 acts as an isolated holding area for data packets sent to and received from other computing devices. For example, data packets can be left on the data porch 130 for collection by other computing devices without the other computing devices gaining access to sensitive areas of analysis engine 110.

Similar to set of CPU(s) 114, set of CPU(s) 114B may include central processing unit(s) (CPUs), microprocessor(s), and/or other hardware device(s) suitable for retrieval and execution of instructions. Each CPU in the set of CPU(s) 114B may fetch, decode, and execute instructions to communicate with other computing devices via remote I/O 132, etc. As an alternative or in addition to retrieving and executing instructions, the set of CPU(s) 114B may include electronic circuits comprising a number of electronic components for performing such functionality.

In one example, computing device 100 places any data that it decides to share on data porch 130, for other computing devices or entities (users, applications, etc.) to collect via remote I/O 132. Likewise, external requests from other devices are also placed on data porch 130 via remote I/O 132 for computing device 100 to interpret and respond to. Computing device 100 can be included in a group (i.e., cluster, distributed computing system, networked servers, etc.) of computing devices that each have an analysis engine 110 and data porch 130 as shown in FIG. 1. For example, a node in the group of computing devices can be configured as a pure analysis engine. In another example, a node in the group of computing devices can also be configured to connect to local data sources or sinks (e.g., various sensors and actuators, local subsystems or data repositories, etc.). The data porch 130 restricts the exchange of information between the analysis engine 110 and the data porch 130. If the throttled data buffer 120 is more open, the data within the node becomes less secure, whereas an overly restrictive throttled data buffer can reduce the utility of the data porch 130.

Throttled data buffer 120 has a throttled data bandwidth that restricts data access between the data porch 130 and the analysis engine 110. In some cases, throttled data buffer 120 can be configured dynamically to provide a tunable data bandwidth so that the volume (i.e., rate and or sizing) of requests and or responses can be modified dependent on the use case or operating state of the computing device 100.

In FIG. 1, computing device 100 includes two isolated compute areas (i.e., the analysis engine 110 and the data porch 130) on the same system on chip (SoC) that are interconnected via a throttled data buffer. As described above, the analysis engine 110 includes CPU(s) 114A for general purpose compute. In some cases, specialized hardware units (e.g. digital signal processor, graphics processing unit, field-programmable gate array, etc.) can also be included in analysis engine 110, but for simplicity these are not shown in the figure. The analysis engine 110 can also include local input/output interfacing (not shown) to access data sources such as data storage, sensors, and actuators.

The data porch 130 also includes CPU(s) 114B, which connect to a separate data backplane and remote I/O interfaces 132 for providing network connectivity (e.g. local area network, wireless local area network). The throttled data buffer 120 provides the channel between the two isolated computing environments of the computing device 110 and becomes the conduit by which data is transferred between the analysis engine 110 and externally requesting entities.

Figure 2:
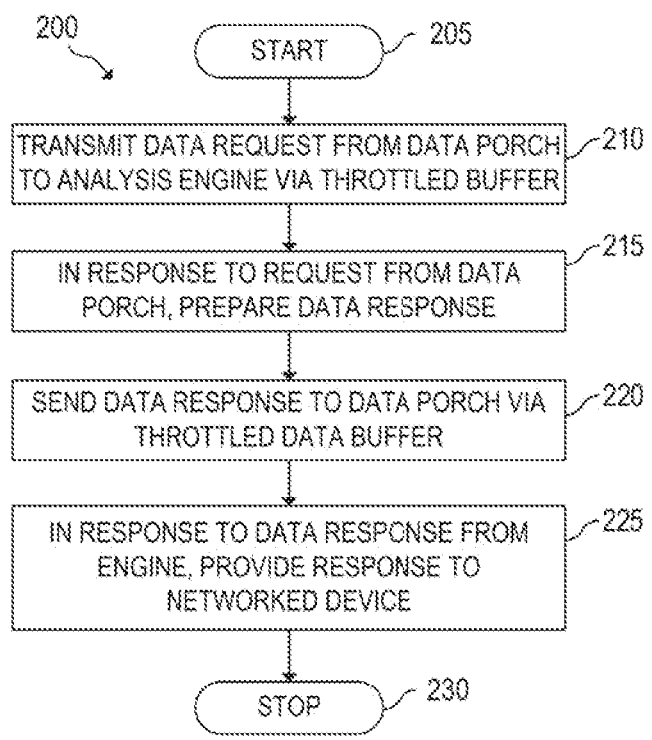
FIG. 2 is a flowchart of an example method for execution by a computing device for throttling data access using a data porch.

FIG. 2 is a flowchart of an example method 200 for execution by computing device 100 for throttling data access using a data porch. Although execution of method 200 is described below with reference to computing device 100 of FIG. 1, other suitable devices for execution of method 200 may be used. Method 200 may be implemented in the form of executable instructions stored on a machine-readable storage medium and/or in the form of electronic circuitry.

Method 200 may start in block 205 and continue to block 210, where computing device 100 transmits a data request from a data porch to an analysis engine via a throttled data buffer. The data request can be initiated in response to a request received at a remote I/O interface of the data porch from a networked device. In block 215, computing device 100 uses analysis engine to prepare a data response to the data request. For example, analysis engine can be used to retrieve data records in response to a data request.

In block 220, computing device 100 sends the data request from the analysis engine to the data porch via the throttled data buffer. During the transmission, the throttled data buffer has a throttled data bandwidth that limits the data flow available to the data porch when retrieving the data response. Data flow may correspond to the volume of data (e.g., megabits per second), volume of data requests (e.g., data requests per second), and/or volume of data requests and data responses (i.e., monitoring when both a data request and corresponding data response occur). In block 225, the data porch provides the data response to the networked device. Because the data porch is isolated to the analysis engine, the networked device's access is limited to data accessible to the data porch. Accordingly, if the networked device infiltrated the data porch, the network device would still be unable to access data isolated in the analysis engine. Method 200 may then continue to block 230, where method 200 may stop.

Figure 3A:
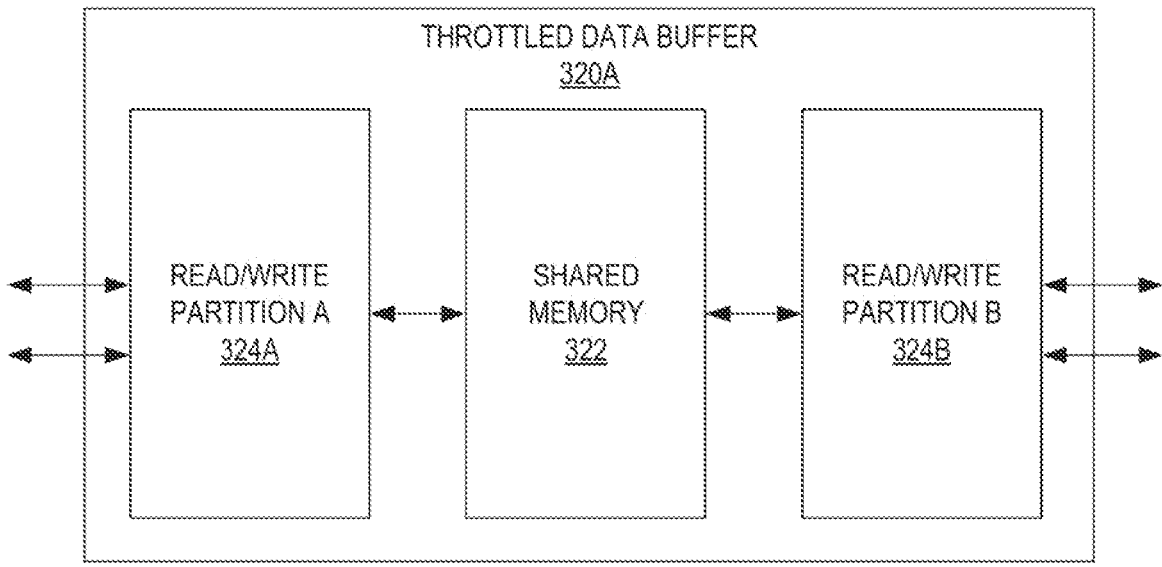
FIG. 3A is a block diagram of an example throttled data buffer with shared memory.

FIG. 3A is a block diagram of example throttled data buffer 320A with shared memory 322. As illustrated in FIG. 3A and described below, throttled data buffer 320A may provide a data porch with throttled data access to an analysis engine. Throttled data buffer 320A may be substantially similar to throttled data buffer 120 of FIG. 1.

As illustrated, throttled data buffer 320A includes read/write partitions 324A, 324B and shared memory 322. Throttled data buffer 320A acts as a dual port memory block that provides shared memory 322 within which requests and responses can be communicated between the data porch and analysis engine. In this example, throttled data buffer 320A provides read/write access on both sides via the read/write partitions 324A, 324B. Limiting the physical size of shared memory 322 provides a natural contraction in the volume of data flowing through the throttled data buffer 320A, as would sub-clocking the read-write duty cycles to extend the time required to insert or remove (i.e., read/write) data from the shared memory 322.

Figure 3B:
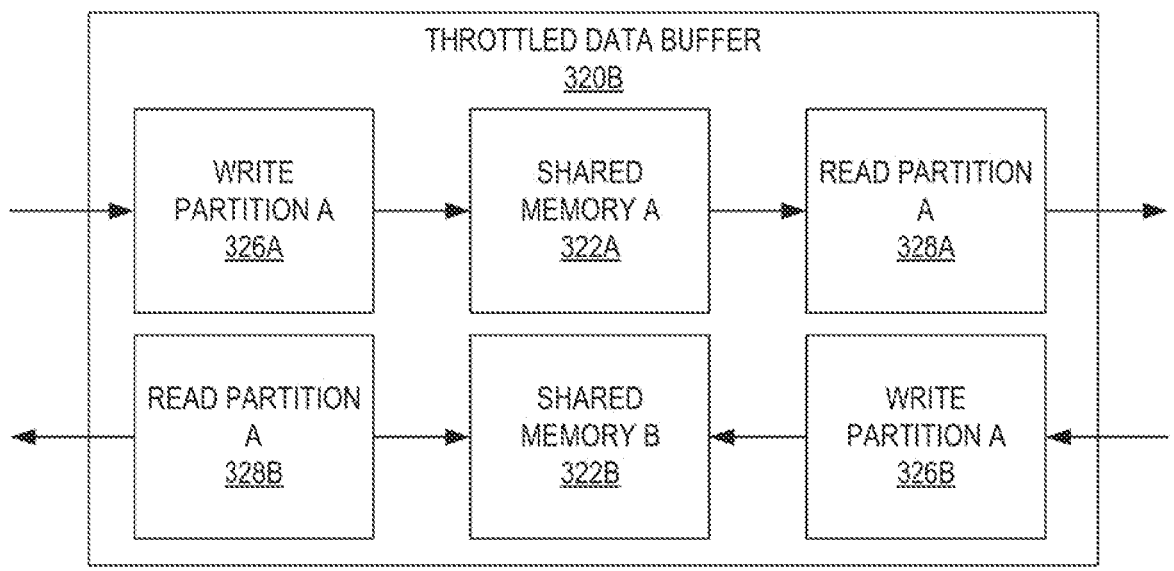
FIG. 3B is a block diagram of an example throttled data buffer with separate incoming and outgoing shared memory.

In another example as shown in FIG. 3B, the shared memory is split into two unidirectional memory partitions 322A and 322B with one responsible for data transfer in each direction. In this case, data responses could be written by an analysis engine to write partition A 326A, transmitted to shared memory A 322A, and then read from read partition A 328A by a data porch. Similarly, data requests could be written by the data porch to write partition B 326B, transmitted to shared memory B 322B, and then read from read partition B 328B by the analysis engine.

In yet another example, the available buffer sizing could be dynamically adjusted with read/write partitions that are scaled across some or all of the buffer. The dynamic buffer enables access to be governed between completely opening access, a blend of unidirectional memory locations, and disabling all access, all of which can be configured or modified dynamically by the analysis engine. In some cases, the dynamic buffer can be modified according to a transmission threshold. For example, the dynamic buffer can be designated as open until a transmission threshold is satisfied (i.e., a predetermined amount of data has been transmitted during a time period). In this example, the dynamic buffer can have a maximum throughput that is limited by the hardware implementation of the throttled data buffer 320A.

In yet another example, first-in/first-out (FIFO) buffers can be allocated from the shared memory of the throttled data buffer. FIFO buffers provide a mechanism to push data into a queue that the other party can pop data from. Requests and responses to such requests could traverse between the data porch and the analysis engine via a pair of unidirectional FIFO blocks. The FIFO blocks provide a means to limit the volume of requests and responses by limiting both the size and number of datagrams that can be held within the FIFO. Once full, each side (analysis engine and data porch) holds datagrams until the FIFO can accommodate additional datagrams. The capacity of each FIFO block can be dynamically scaled by the analysis engine. For example, a shared memory block could be dynamically reallocated to either of the unidirectional FIFO blocks, enabling scaling of one FIFO block at the expense of the other.

Figure 4:
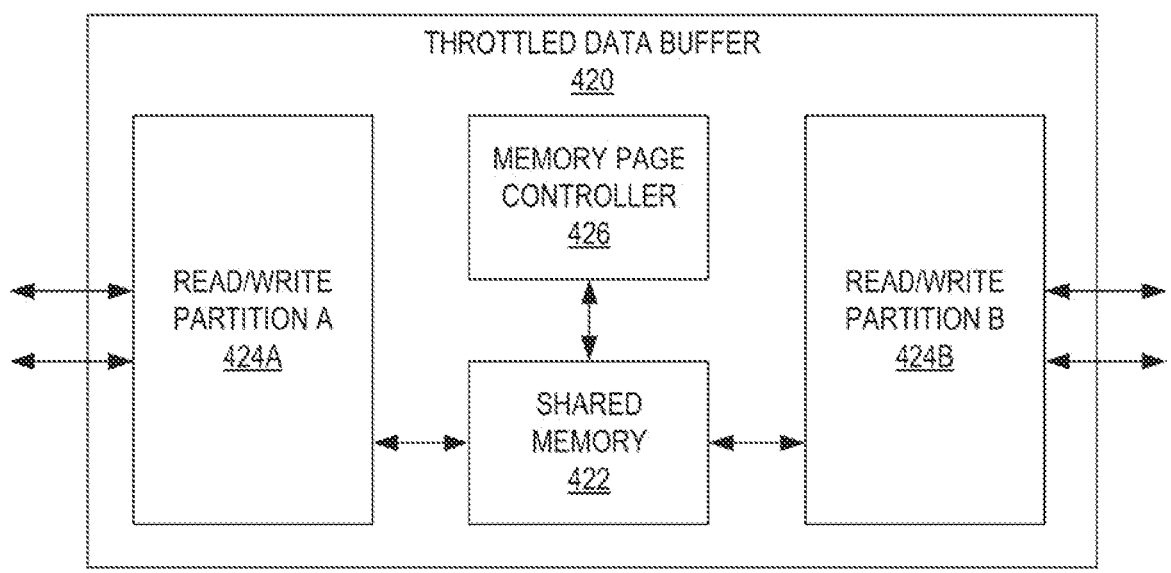
FIG. 4 is a block diagram of an example throttled data buffer with a memory page controller.

FIG. 4 is a block diagram of an example throttled data buffer 420 with a memory page controller 426. As illustrated in FIG. 4 and described below, throttled data buffer 420 may provide a data porch with throttled data access to an analysis engine. Throttled data buffer 420 may be substantially similar to throttled data buffer 120 of FIG. 1.

As illustrated, throttled data buffer 420 includes read/write partitions 424A, 424B, shared memory 422, and memory page controller 426. Read/write partitions 424A, 424B and shared memory 422 may be substantially similar to the corresponding components described above with respect to FIGS. 3A and 3B. Memory page controller 426 is configured to partition the shared memory 422 into a set of virtual memory spaces, or pages. The allocation of the pages could be managed by an analysis engine to provide some additional utilization options. For example, memory pages could be allocated to either side of the throttled data buffer 420, or to both sides at the same time (as per dual port memories). The accessibility of each page could be programmatically linked to the number of data accesses performed on each page thereby limiting the number of times a particular datagram could be accessed. Once utilized, a page could be deallocated and the physical memory reallocated to another page or left dormant until required. In some cases, a large data response can be placed within a specific page of shared memory 422 (sized to match the scale of the response) with the data porch provided with a one-time opportunity to read the data, after which the response would be inaccessible via deallocation of the appropriate page.

The foregoing disclosure describes a number of examples for throttling data access using a data porch. In this manner, the examples disclosed herein enable throttled data access by connected two isolated computing environments (an analysis engine and a data porch) via a throttled data buffer, where data can be left on the isolated data porch for collection by networked computing devices.

We claim:

1. A system for limiting physical access to memory at a silicon level, the system comprising:
 a data porch comprising:
  a second subset of a plurality of hardware processors, wherein second subset of the plurality of hardware processors are to:
   receive a data request from a networked device of a plurality of networked devices via the remote input and output,
   send the data request to an analysis engine via a throttled data buffer, and
   in response to receiving a data response from the analysis engine via the throttled data buffer, provide the data response to the networked device of the plurality of networked devices via the remote input and output; and
  remote input and output for connecting the second subset of the plurality of hardware processors with the plurality of networked devices;
 the throttled data buffer configured between the data porch and the analysis engine, wherein the throttled data buffer to restrict a data flow from the data porch to the analysis engine to a throttled data bandwidth, wherein the data flow of the data requests and the data flow of the data responses are limited after a transmission threshold is satisfied, and wherein the throttled data buffer comprises a plurality of unidirectional memory partitions to limit a volume of requests and responses by limiting both a size and a number of datagrams that are held within the unidirectional memory partitions, wherein the throttled data buffer is to:
  receive the data request from the data porch, and
  upon reaching the throttled data bandwidth, limit the data flow from the data porch to the analysis engine to the transmission threshold; and
 the analysis engine comprising:
  the first subset of the plurality of hardware processors to:
   in response to a data request from the data porch via the throttled data buffer, access the memory to prepare a data response for the data request, and
   send the data response to the data porch via the throttled data buffer; and
  the memory being accessible to the first subset of the plurality of hardware processors, wherein the memory comprises data that is inaccessible to the networked device of the plurality of networked devices via the remote input and output absent the throttled data buffer.

2. The system of claim 1, wherein the throttled data buffer comprises a shared memory, an engine read/write partition, and a porch read/write partition, and wherein the engine read/write partition is used by the analysis engine to access the shared memory and the porch read/write partition is used by the data porch to access the shared memory.

3. The system of claim 1, wherein a first partition of the plurality of unidirectional memory partitions is used to transmit the data request, and wherein a second partition of the plurality of unidirectional memory partitions is used to transmit the data response.

4. The system of claim 3, wherein the data flow of the data requests is limited by a first size of the first partition, and wherein the data flow of the data responses is limited by a second size of the second partition.

5. The system of claim 1, wherein the throttled data buffer comprises a shared memory that is managed by the analysis engine, and wherein the first subset of the plurality of hardware processors is further to:
 allocate a first page in the shared memory for transmitting the data request;
 allocate a second page in the shared memory for transmitting the data response; and
 deallocate the second page after the data response is received by the data porch.

6. The system of claim 1, wherein the data porch is an isolated holding area for data packets sent to and received from other computing devices by the system.

7. The system of claim 1, wherein the data porch receives data packets left for collection by other computing devices.

8. The system of claim 7, wherein the data packets left for collection by other computing devices restricts access to sensitive areas of the analysis engine by the other computing devices.

9. The system of claim 1, wherein the plurality of unidirectional memory partitions comprise a plurality of first-in/first-out (FIFO) memory blocks.

10. The system of claim 1, wherein the memory accessed by the analysis engine comprises a first memory and a second memory, wherein the first memory is accessible to the first subset of the plurality of hardware processors, and wherein the second memory is not accessible to the second subset of the plurality of hardware processors.

11. A method for limiting physical access to memory at a silicon level, the method comprising:
 receiving, by a data porch of a system, a data request from a networked device of a plurality of networked devices;
 sending, by the data porch to an analysis engine via a throttled data buffer, the data request, wherein the throttled data buffer is configured between the data porch and the analysis engine, and wherein the throttled data buffer comprises a plurality of unidirectional memory partitions to limit a volume of requests and responses by limiting both a size and a number of datagrams that are held within the unidirectional memory partitions;

restricting, by the throttled data buffer of the system, a data flow from the data porch to the analysis engine to a throttled data bandwidth, wherein the data flow of the data requests and the data flow of the data responses are limited after a transmission threshold is satisfied;

upon reaching the throttled data bandwidth, limiting, by the throttled data buffer, the data flow from the data porch to the analysis engine to the transmission threshold;

in response to a data request from the data porch via the throttled data buffer, accessing, by the analysis engine of the system, memory to prepare a data response for the data request;

preparing, by the analysis engine, a data response for the data request;

sending, by the analysis engine, the data response to the data porch via the throttled data buffer; and in response to receiving the data response from the analysis engine via the throttled data buffer, using the data porch to provide the data response to the networked device of the plurality of networked devices.

12. The method of claim 11, wherein the throttled data buffer comprises a shared memory, an engine read/write partition, and a porch read/write partition, and wherein the engine read/write partition is used by the analysis engine to access the shared memory and the porch read/write partition is used by the data porch to access the shared memory.

13. The method of claim 11, wherein a first partition of the plurality of unidirectional memory partitions is used to transmit the data request, and wherein a second partition of the plurality of unidirectional memory partitions is used to transmit the data response.

14. The method of claim 13, wherein the data flow of the data requests is limited by a first size of the first partition, and wherein the data flow of the data responses is limited by a second size of the second partition.

15. The method of claim 11, wherein the throttled data buffer comprises a shared memory that is managed by the analysis engine, and wherein the method further comprises:
allocating a first page in the shared memory for transmitting the data request;
allocating a second page in the shared memory for transmitting the data response; and
deallocating the second page after the data response is received by the data porch.

16. A non-transitory machine-readable storage medium encoded with instructions executable by a processor for limiting physical access to memory at a silicon level, the machine-readable storage medium comprising instructions to:

receive, by a data porch, a data request from a networked device of a plurality of networked devices;

send, by the data porch to an analysis engine via a throttled data buffer, the data request, wherein the throttled data buffer is configured between the data porch and the analysis engine, and wherein the throttled data buffer comprises a plurality of unidirectional memory partitions to limit a volume of requests and responses by limiting both a size and a number of datagrams that are held within the unidirectional memory partitions;

restrict, by the throttled data buffer, a data flow from the data porch to the analysis engine to a throttled data bandwidth, wherein the data flow of the data requests and the data flow of the data responses are limited after a transmission threshold is satisfied;

upon reaching the throttled data bandwidth, limit, by the throttled data buffer, the data flow from the data porch to the analysis engine to the transmission threshold;

in response to the data request from the data porch via the throttled data buffer, access, by the analysis engine, memory to prepare a data response for the data request;

prepare, by the analysis engine, a data response for the data request;

send, by the analysis engine, the data response to the data porch via the throttled data buffer; and in response to receiving the data response from the analysis engine via the throttled data buffer, use the data porch to provide the data response to the networked device of the plurality of networked devices.

17. The non-transitory machine-readable storage medium of claim 16, wherein the throttled data buffer further comprises an engine read/write partition and a porch read/write partition, and wherein the engine read/write partition is used by the analysis engine to access the shared memory and the porch read/write partition is used by the data porch to access the shared memory.

* * * * *